US012553636B2

(12) United States Patent
Janniello

(10) Patent No.: US 12,553,636 B2
(45) Date of Patent: Feb. 17, 2026

(54) AIR VENT CONTROLLER

(71) Applicant: James P Janniello, Sarasota, FL (US)

(72) Inventor: James P Janniello, Sarasota, FL (US)

( * ) Notice: Subject to any disclaimer, the term of this patent is extended or adjusted under 35 U.S.C. 154(b) by 724 days.

(21) Appl. No.: 17/485,387

(22) Filed: Aug. 26, 2021

(65) Prior Publication Data

US 2022/0011003 A1    Jan. 13, 2022

Related U.S. Application Data

(63) Continuation of application No. 15/659,022, filed on Jul. 25, 2017, now abandoned.

(51) Int. Cl.
| | |
|---|---|
| *F24F 11/79* | (2018.01) |
| *F24F 11/30* | (2018.01) |
| *F24F 11/74* | (2018.01) |
| *F24F 13/15* | (2006.01) |
| *F24F 110/10* | (2018.01) |
| *F24F 110/12* | (2018.01) |
| *F24F 110/20* | (2018.01) |
| *F24F 110/22* | (2018.01) |
| *F24F 120/10* | (2018.01) |
| *F24F 120/12* | (2018.01) |
| *F24F 120/14* | (2018.01) |
| *F24F 130/00* | (2018.01) |
| *F24F 130/10* | (2018.01) |
| *F24F 130/20* | (2018.01) |
| *F24F 130/30* | (2018.01) |

(52) U.S. Cl.
CPC .............. *F24F 11/79* (2018.01); *F24F 11/30* (2018.01); *F24F 11/74* (2018.01); *F24F 13/15* (2013.01); *F24F 2110/10* (2018.01); *F24F 2110/12* (2018.01); *F24F 2110/20* (2018.01); *F24F 2110/22* (2018.01); *F24F 2120/10* (2018.01); *F24F 2120/12* (2018.01); *F24F 2120/14* (2018.01); *F24F 2130/00* (2018.01); *F24F 2130/10* (2018.01); *F24F 2130/20* (2018.01); *F24F 2130/30* (2018.01)

(58) Field of Classification Search
CPC .. F24F 11/79; F24F 11/30; F24F 11/74; F24F 11/58; F24F 13/15; F24F 2130/10; F24F 2110/20; F24F 2120/10; F24F 2130/20
USPC .................................................. 454/256, 265
See application file for complete search history.

(56) References Cited

U.S. PATENT DOCUMENTS

| | | | | |
|---|---|---|---|---|
| 4,290,554 A | * | 9/1981 | Hensley ................... | F24F 13/15 454/258 |
| 4,738,116 A | * | 4/1988 | Himeno ................ | F24F 13/075 454/319 |
| 4,961,462 A | * | 10/1990 | Iida ....................... | B60H 1/0075 165/204 |
| 5,253,804 A | * | 10/1993 | Sarazen, Jr. ........... | E04B 1/7069 236/49.5 |

(Continued)

FOREIGN PATENT DOCUMENTS

GB            2480009 A   * 11/2011   ......... F24D 19/1009

*Primary Examiner* — Avinash A Savani
*Assistant Examiner* — Dana K Tighe

(57) ABSTRACT

Methods, systems, and apparatus for controlling an air flow are described. A monitor obtains an environmental parameter and an air deflector controls the air flow exiting an air duct. An air deflector actuator configures the air deflector, the configuration of the air deflector being based on the environmental parameter.

19 Claims, 8 Drawing Sheets

(56) References Cited

U.S. PATENT DOCUMENTS

| | | | | |
|---|---|---|---|---|
| 5,372,545 A * | 12/1994 | Noda | | F24F 11/64 236/51 |
| 5,775,989 A * | 7/1998 | Choi | | F24F 13/06 454/285 |
| 5,857,906 A * | 1/1999 | Cho | | F24F 1/005 236/51 |
| 5,875,639 A * | 3/1999 | Kim | | F24F 11/79 236/51 |
| 6,120,372 A * | 9/2000 | Riello | | F24F 11/79 454/321 |
| 6,188,193 B1 * | 2/2001 | Michelson | | G03B 27/32 355/83 |
| 6,338,677 B1 * | 1/2002 | White | | F24F 11/0001 454/319 |
| 6,685,556 B1 * | 2/2004 | Bertin | | F24F 13/075 454/248 |
| 6,692,349 B1 * | 2/2004 | Brinkerhoff | | F24F 7/00 236/51 |
| 8,374,725 B1 * | 2/2013 | Ols | | F24F 11/77 261/118 |
| 8,636,567 B2 * | 1/2014 | Fitzgerald | | F24F 11/56 454/319 |
| 8,882,572 B2 * | 11/2014 | McReynolds | | G05D 23/27 137/343 |
| 8,973,845 B2 * | 3/2015 | Kanaya | | F24F 11/30 62/177 |
| 9,080,782 B1 * | 7/2015 | Sheikh | | F24F 11/30 |
| 9,471,070 B2 * | 10/2016 | Sabripour | | G05D 23/1927 |
| 9,618,224 B2 * | 4/2017 | Emmons | | F24F 11/62 |
| 9,854,335 B2 * | 12/2017 | Patel | | G01N 19/10 |
| 10,132,516 B2 * | 11/2018 | Lin | | F24F 11/62 |
| 10,209,692 B2 * | 2/2019 | Sartain | | H04L 67/01 |
| 2004/0074244 A1 * | 4/2004 | Ichishi | | B60H 1/00842 165/204 |
| 2006/0255165 A1 * | 11/2006 | Ha | | F24F 11/56 236/94 |
| 2008/0009237 A1 * | 1/2008 | Wu | | F24F 11/30 454/256 |
| 2008/0119127 A1 * | 5/2008 | Stewart | | F24F 13/12 454/256 |
| 2010/0025483 A1 * | 2/2010 | Hoeynck | | H02J 3/14 236/1 C |
| 2012/0046792 A1 * | 2/2012 | Secor | | F24F 11/56 702/45 |
| 2012/0145802 A1 * | 6/2012 | Peterson | | F24F 11/62 236/49.3 |
| 2012/0221151 A1 * | 8/2012 | Steinberg | | G06N 7/01 700/276 |
| 2012/0259470 A1 * | 10/2012 | Nijhawan | | G05D 23/1934 700/278 |
| 2014/0065939 A1 * | 3/2014 | Dietz | | F24F 11/0001 454/234 |
| 2014/0326794 A1 * | 11/2014 | Frank | | F24F 11/523 236/51 |
| 2015/0133043 A1 * | 5/2015 | Patel | | F24F 11/63 454/258 |
| 2015/0338123 A1 * | 11/2015 | Iwano | | F24F 13/20 454/301 |
| 2016/0012309 A1 * | 1/2016 | Manabe | | G06T 11/20 382/103 |
| 2016/0153674 A1 * | 6/2016 | Lancaster | | F24F 11/58 700/276 |
| 2016/0363341 A1 * | 12/2016 | Arens | | F24F 11/77 |
| 2017/0045255 A1 * | 2/2017 | Karamanos | | G05B 17/02 |
| 2017/0130978 A1 * | 5/2017 | Edwards | | F24F 11/79 |
| 2017/0307242 A1 * | 10/2017 | Handsaker | | F24F 13/078 |
| 2017/0321920 A1 * | 11/2017 | Rosen | | F24F 11/46 |
| 2019/0041883 A1 * | 2/2019 | Clark | | G05D 23/1934 |

\* cited by examiner

AIR VENT CONTROLLER

TECHNICAL FIELD

The present application relates generally to controlling air flow, and more specifically, in one example, to controlling air flow through or exiting an air duct.

BACKGROUND

Air ducts provide a mechanism for transporting air to a particular location, such as a particular room or area in a residential home, office building, factory, hotel, boat, automobile, and the like. The air can be warmed or cooled to a particular temperature, humidified or dehumidified to a particular level of humidity, and the like prior to exiting the air duct. While the temperature or humidity level can be regulated to some degree, the amount of air to exit the air duct is typically only regulated to one of two amounts: no air flow or a defined amount of air flow that is statically configured near a source of the air flow. The direction of the air flow exiting the air duct is also configured once and remains static.

BRIEF DESCRIPTION OF THE DRAWINGS

Some embodiments are illustrated by way of example and not limitation in the figures of the accompanying drawings, in which.

DETAILED DESCRIPTION

Figure 1:
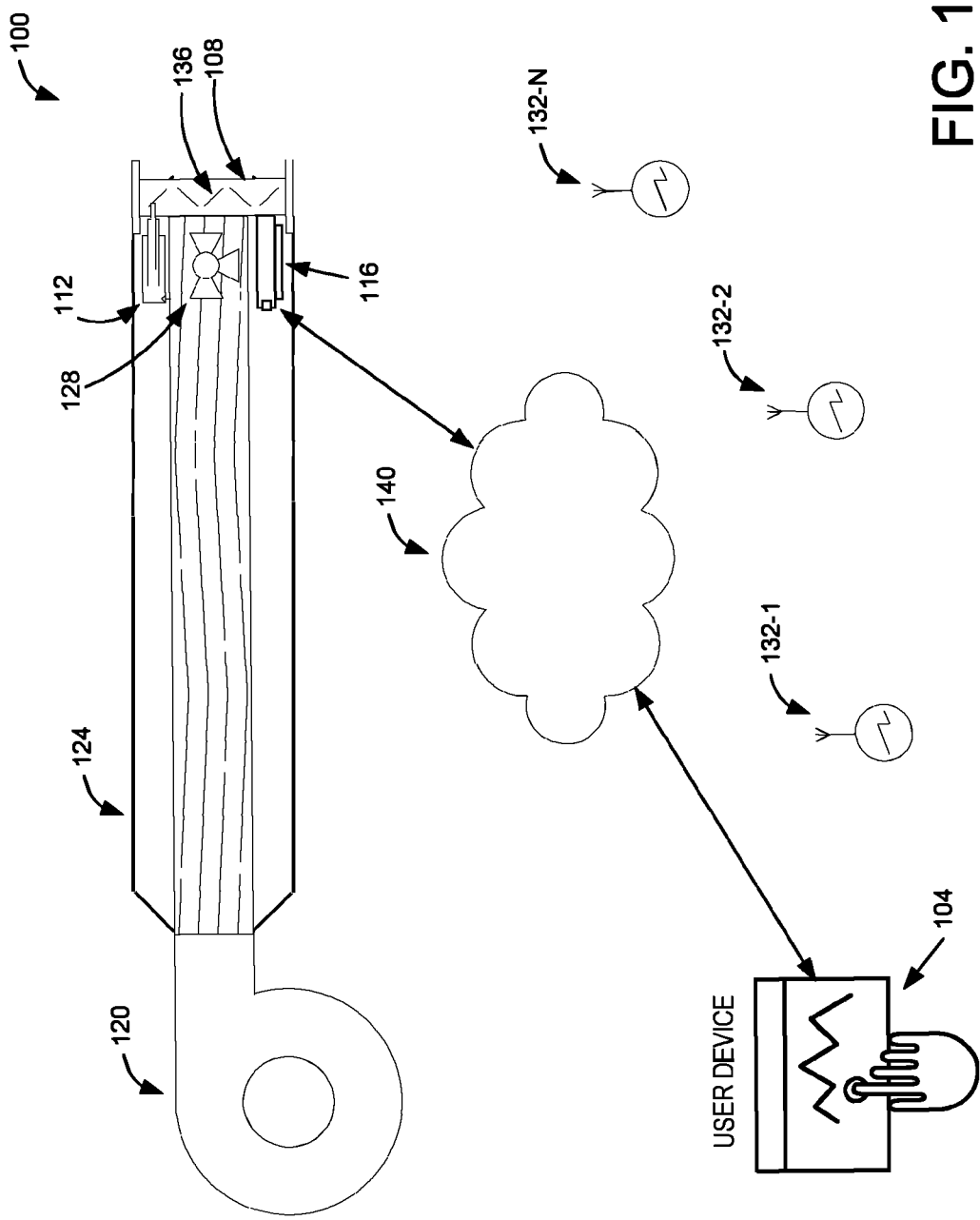
FIG. 1 is a block diagram of an example air vent system for controlling air flow, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for controlling air flowing through an air duct, exiting an air duct, or both are disclosed. In one example embodiment, an air vent controller is inserted within or attached to an air duct. The air vent controller may be adjusted to control a direction of air flow, an amount of air flow through or exiting the air duct, or any combination thereof. The air vent controller may be powered by a collocated battery, by a remote electrical source, or by a generator. The generator may be collocated with the air vent controller or remotely located. The generator may generate electricity by converting the kinetic energy of the air flowing through the air duct, or through another air duct, into electricity. The generator or the remote electrical source may recharge a battery, if available, that can power the air vent controller.

In one example embodiment, a monitoring unit monitors one or more environmental conditions, such as ambient temperature, surface temperature of an entity, humidity, amount of light, presence of a person, time of day, season, and the like. The monitoring unit may be collocated with or remotely located from the air vent controller. In one example embodiment, the monitoring unit measures an amount of sunlight (i.e., measures an amount of light composed of wavelengths that correspond to sunlight). In one example embodiment, the monitoring unit may detect the presence of a person or may detect the transit of a person, such as a person walking by the monitoring unit. A person may be detected based on a heat signature, a change in light intensity observed by the monitoring unit, and the like.

In one example embodiment, the air vent controller is adjusted based on an ambient temperature, a surface temperature of an entity, a rate of a temperature change, a humidity level, an amount of light received, an amount of sunlight received, a time of day, a season, a location or activity of a person (such as sleeping, reading, sitting, and the like), a number (count) of occupants of a room or building, a user request, a weather forecast, and the like. The season may simply identify summer, winter, spring, or fall, or may identify a particular day of the season, such that a determination may be made as to whether, for example, it is early winter, mid-winter, late winter, and the like. The season and weather forecast may be indicative, for example, of an amount of sunlight to be received by a particular area of a room associated with the air vent controller. The weather forecast may similarly be indicative of an external temperature, solar exposure, humidity level, and the like that may impact a room or other location. The air vent controller may be adjusted to anticipate a change in the temperature or humidity level of a room or other location based on the season or weather forecast.

In one example embodiment, the monitoring unit communicates with the air vent controller via a wireless or wired communication link. Communication links include, but are not limited to, WiFi (e.g., IEEE 802.11), Bluetooth, Universal Serial Bus (USB), and the like. In one example embodiment, a monitoring unit may send reports to multiple air vent controllers. Each monitoring unit may be assigned an identifier, a set of transmission frequencies, and the like to distinguish its communications from the communications of other monitoring units.

FIG. 1 is a block diagram of an example air vent system 100 for controlling air flow, in accordance with an example embodiment. In one example embodiment, the air vent system 100 may comprise an air deflector 108, an air deflector actuator unit 112, an air control processing system 116, a generator 128, a network 140, and one or more monitors 132-1, ..., 132-N (collectively known as monitors 132 hereinafter). A user device 104 may be used to configure and control the air vent system 100. One or more of the monitors 132 may be housed within or collocated with the air control processing system 116. In addition, the air deflector 108, the air deflector actuator unit 112, the air control processing system 116, and one or more of the monitors 132 may be housed in the same unit.

The air deflector 108 comprises one or more fins 136. Each fin 136 may be used for controlling an amount of air flow, controlling a direction of air flow, or both, the air flow being produced by a fan 120 blowing air through an air duct 124. A fin 136 may have a fixed location, a configurable location, a fixed orientation, a configurable orientation, or a combination thereof. A set of fins 136 may be dedicated to controlling air flow exiting the center of the air duct (known as the "center set" herein) and a set of fins may be dedicated to controlling air flow exiting, for example, each side of the air duct (known as "quadrants" herein).

The air deflector actuator unit 112 may comprise, for example, one or more servos. Each servo may configure a location of one or more fins 136, an orientation of one or more fins 136, or both.

The air control processing system 116 may include a processor (e.g., a central processing unit (CPU), a graphics processing unit (GPU), and the like) and a memory, which communicate with each other via a bus. The air control processing system 116 may further include a video display (e.g., a plasma display, a liquid crystal display (LCD), or a cathode ray tube (CRT)). The air control processing system 116 may also include an alphanumeric input device (e.g., a keyboard), a user interface (UI) navigation device (e.g., a mouse and/or touch screen), a drive unit, a signal generation device (e.g., a speaker), and a network interface device.

The drive unit, such as a removable drive unit, includes a machine-readable medium on which is stored one or more sets of instructions and data structures embodying or utilized by any one or more of the methodologies or functions described herein. The instructions may also reside, completely or at least partially, within the memory and/or within the processor during execution thereof by the air control processing system 116. The instructions may further be transmitted or received over the network 140 via the network interface device utilizing any one of a number of well-known transfer protocols (e.g., hypertext transfer protocol (HTTP)).

The network 140 may be a local area network (LAN), a wireless network, a metropolitan area network (MAN), a wide area network (WAN), a wireless network, a network of interconnected networks, the public switched telephone network (PSTN), an electrical power-based network (such as a network using the X.10 protocol), and the like. Communication links include, but are not limited to, WiFi (e.g., IEEE 802.11), Bluetooth, USB, and the like. In one example embodiment, the network 140 may comprise one or more routers and/or device switches (not shown).

Each monitor 132 monitors one or more environmental conditions, such as ambient temperature, a surface temperature of an entity, a rate of temperature change, a humidity level, an amount of light received, an amount of sunlight received, a time of day, a season, a location or activity of a person (such as sleeping, reading, sitting, and the like), a number (count) of occupants of a room or building, a user request, a weather forecast, or any combination thereof.

Each monitor 132 may be located remotely, may be located with the air deflector actuator unit 112, may be located with the air control processing system 116, or any combination thereof. Each monitor 132 may communicate with the air control processing system 116 via the network 140 or a communication link of the network 140, as described above.

Figure 2:
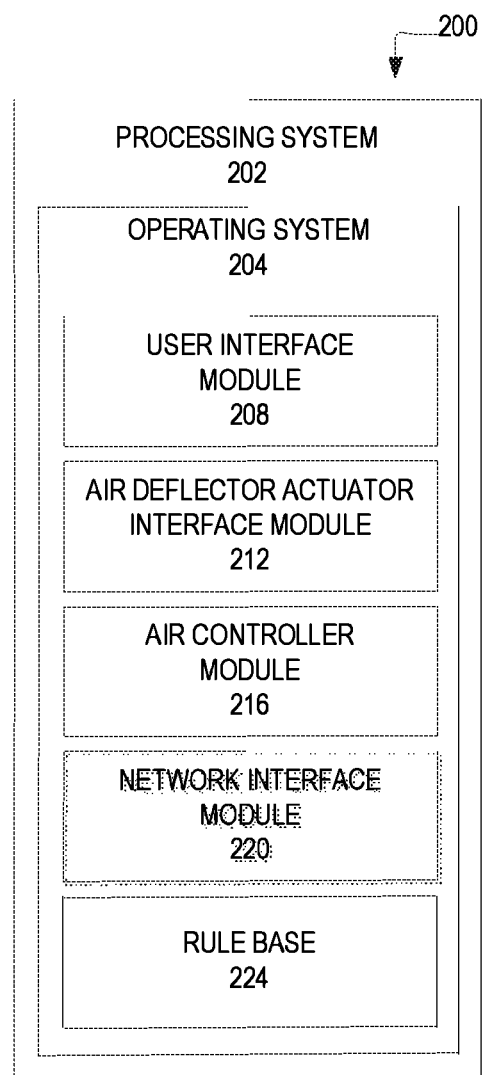
FIG. 2 is a block diagram of an example apparatus for controlling an air deflector and an air deflector actuator unit, in accordance with an example embodiment.

FIG. 2 is a block diagram of an example apparatus 200 for controlling the air deflector 108 and the air deflector actuator unit 112, in accordance with an example embodiment. In one example embodiment, the apparatus 200 may serve as the air control processing system 116.

The apparatus 200 is shown to include a processing system 202 that may be implemented on a server, client, or other processing device, and that includes an operating system 204 for executing software instructions. In accordance with an example embodiment, the processing system 202 may include a user interface module 208, an air deflector actuator interface module 212, an air controller module 216, a network interface module 220, and a rule base 224.

The user interface module 208 provides an interface for configuring the apparatus 200 and defining rules of the rule base 224. For example, target temperatures and target humidity levels may be configured via the user interface module 208. Fin settings (defining the location, the orientation, or both of one or more fins 136) may also be established via the user interface module 208. The user interface module 208 may receive requests from a user to configure the fins 136 based on a predefined configuration, or based on a dynamic adjustment of the fins 136. In one example embodiment, the request may be received from a remote control unit, a mobile application, and the like. In one example embodiment, the user request may override configurations determined based on rules of the rule base 224. A user interface generated by the user interface module 208 is described more fully below by way of example in conjunction with FIG. 4.

The air deflector actuator interface module 212 provides an interface for sending commands to the air deflector actuator unit 112 to adjust one or more fins 136 of the air deflector 108, one or more dampers (not shown), and the like. As used herein, a damper may comprise a single fin or a plurality of fins 136 for controlling an amount of air flow through an air duct 124 or a portion of an air duct 124. In one example embodiment, commands may be sent to other elements in addition to the fins 136 and the damper(s). For example, commands may be sent to fans; air conditioning units; heating, ventilating, and air conditioning (HVAC) systems; radiators; and other components and systems to configure the elements using the techniques disclosed herein.

The air controller module 216 receives data from each monitor 132 via the network interface module 220 and processes the data to determine the configuration of one or more fins 136 of the air deflector 108, one or more dampers, and the like. The air controller module 216 instructs the air deflector actuator interface module 212 to configure the fins 136 of the air deflector 108. The air controller module 216 may also process a request received via a remote control unit, a mobile application, and the like.

The network interface module 220 provides an interface to the network 140. Data from each monitor 132 may be transferred via the network interface module 220 to the air controller module 216.

The rule base 224 comprises a rule(s) for processing data received from the monitors 132 and determining a configuration of the fins 136, one or more dampers, and the like, as described more fully below by way of example in conjunction with FIGS. 3A and 3B. The rule base 224 may be a component of the air control processing system 116. In one example embodiment, the rules of the rule base 224 may control an HVAC system that generates the air flow through the air duct 124. For example, the air vent system 100 may emulate the control signals of a thermostat connected to the HVAC system and may generate the control signals according to the rules of the rule base 224.

Figure 3A:
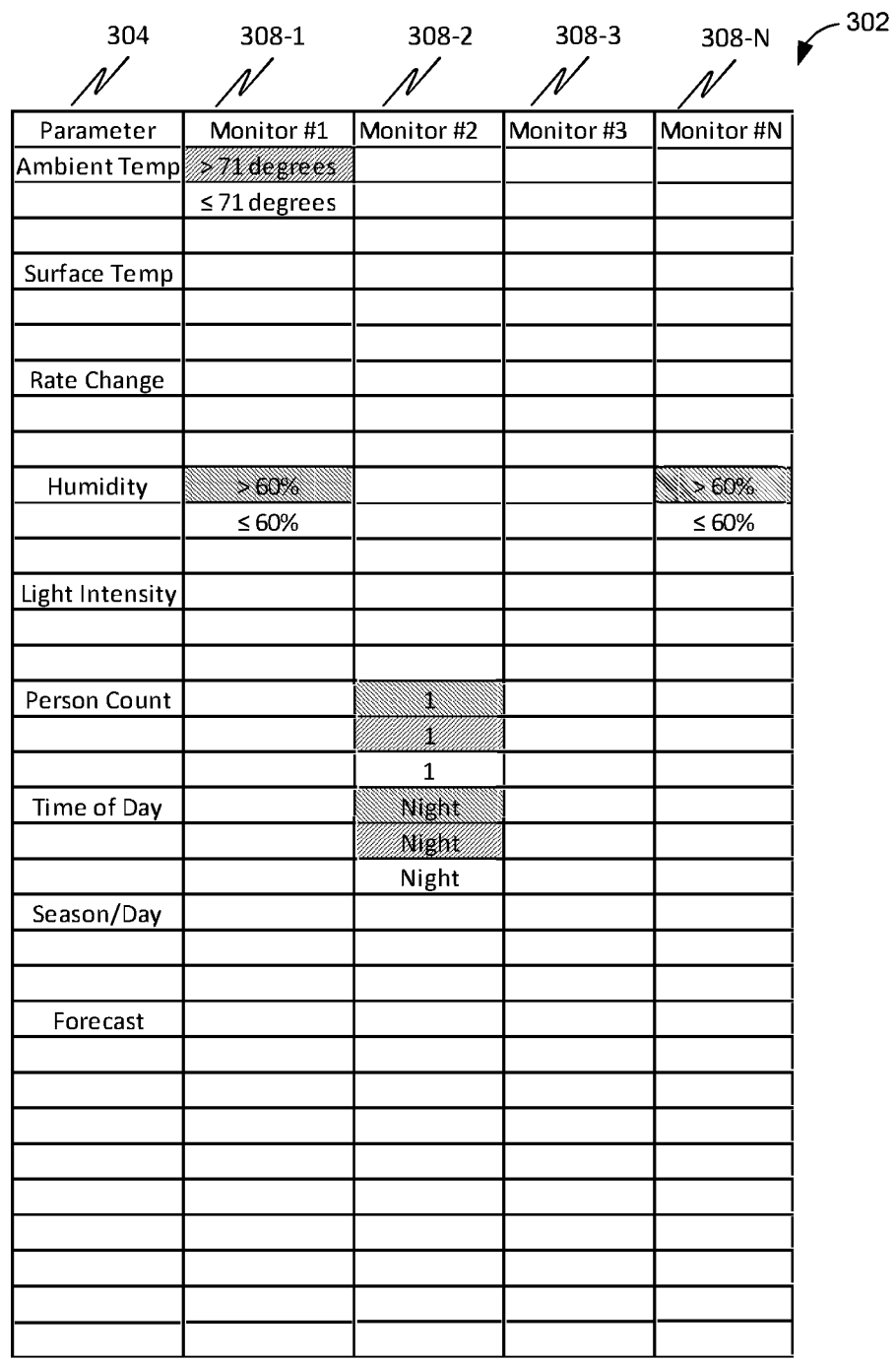
FIGS. 3A and 3B illustrate an example rule base for determining a configuration of the air deflector, in accordance with an example embodiment.
Figure 3B:
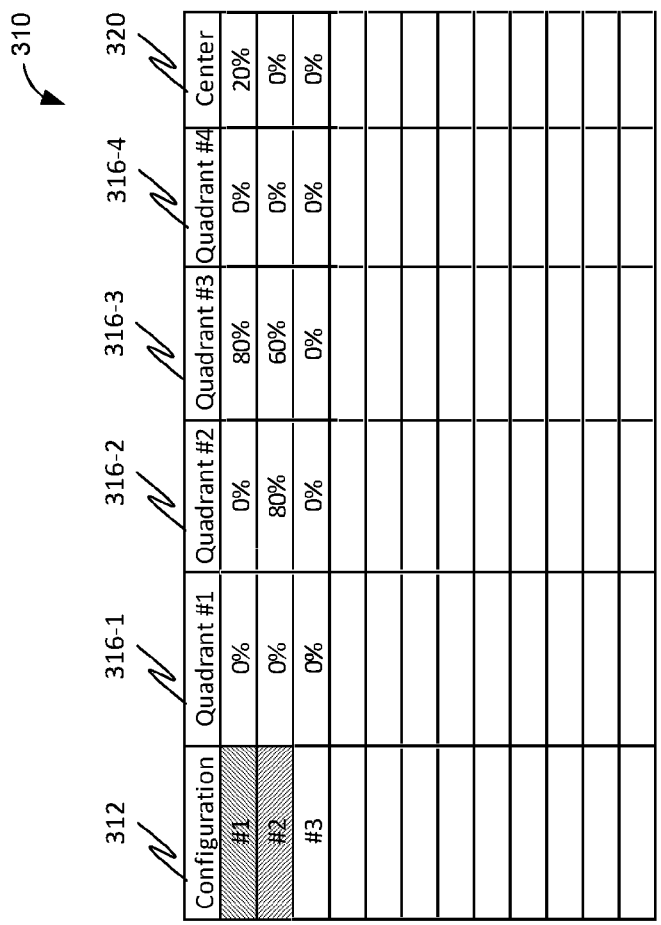

FIGS. 3A and 3B illustrate an example rule base 302, 310 for determining a configuration of the air deflector 108, in accordance with an example embodiment. FIG. 3A illustrates one or more sets of conditions for executing a corresponding configuration of the air vent system 100, as indicated in FIG. 3B. In one example embodiment, one or more air dampers that control an amount of air flow through the air duct 124 may be configured based on the one or more sets of conditions.

As illustrated in FIG. 3A, each set of conditions is identified by a unique background. If all of the conditions corresponding to a particular background are satisfied (true), then the configuration of FIG. 3B that has the same background is executed. The rule base 302, 310 includes a column 304 that identifies the available parameters, such as ambient temperature, and columns 308-1, . . . , 308-N that each represent a corresponding monitor 132 that is in communication with the air control processing system 116. As illustrated in FIG. 3A, a first set of conditions consists of the monitor 132-1 detecting a temperature of greater than 71 degrees, the monitor 132-2 detecting a person, and the time of day being night (as defined by, for example, a local sunset and sunrise). A second set of conditions consists of the monitor 132-1 detecting a humidity level of greater than 60%, the monitor 132-2 detecting a person, the time of day being night (as defined, for example, by the time of the local sunrise and sunset), and the monitor 132-N detecting a humidity level of greater than 60%. A third set of conditions consists of the monitor 132-1 detecting a temperature of less than or equal to 71 degrees, the monitor 132-1 detecting a humidity level of less than or equal to 60%, the monitor 132-2 detecting a person, the time of day being night (as defined, for example, by the time of the local sunrise and sunset), and the monitor 132-N detecting a humidity level of less than or equal to 60%.

As illustrated in FIG. 3B, column 312 identifies configurations that are defined for the air vent system 100. Columns 316-1, . . . , 316-4 define an amount of air flow allowed for each of four quadrants of the air deflector 108. Quadrant #1 may correspond, for example, to a left side of the air deflector 108, quadrant #2 may correspond to a right side of the air deflector 108, quadrant #3 may correspond to a top side of the air deflector 108, and quadrant #4 may correspond to a bottom side of the air deflector 108. In one example embodiment, column 320 corresponds to a center section of the air deflector 108. An amount of air flow through each quadrant and center section of the air deflector 108 may be individually controlled. For example, if the first set of conditions is satisfied, configuration #1 is executed. Configuration #1 configures the fins 136 to allow 80% of the maximum allowable air flow for quadrant #3, 20% of the maximum allowable air flow for the center section, and no air flow for the remaining quadrants. Configuration #2 configures the fins 136 to allow 80% of the maximum allowable air flow for quadrant #2, 60% of the maximum allowable air flow for quadrant #3, and no air flow for the remaining quadrants and the center section. Configuration #3 configures the fins 136 to allow no air flow for all four quadrants and the center section of the air deflector 108.

Figure 4:
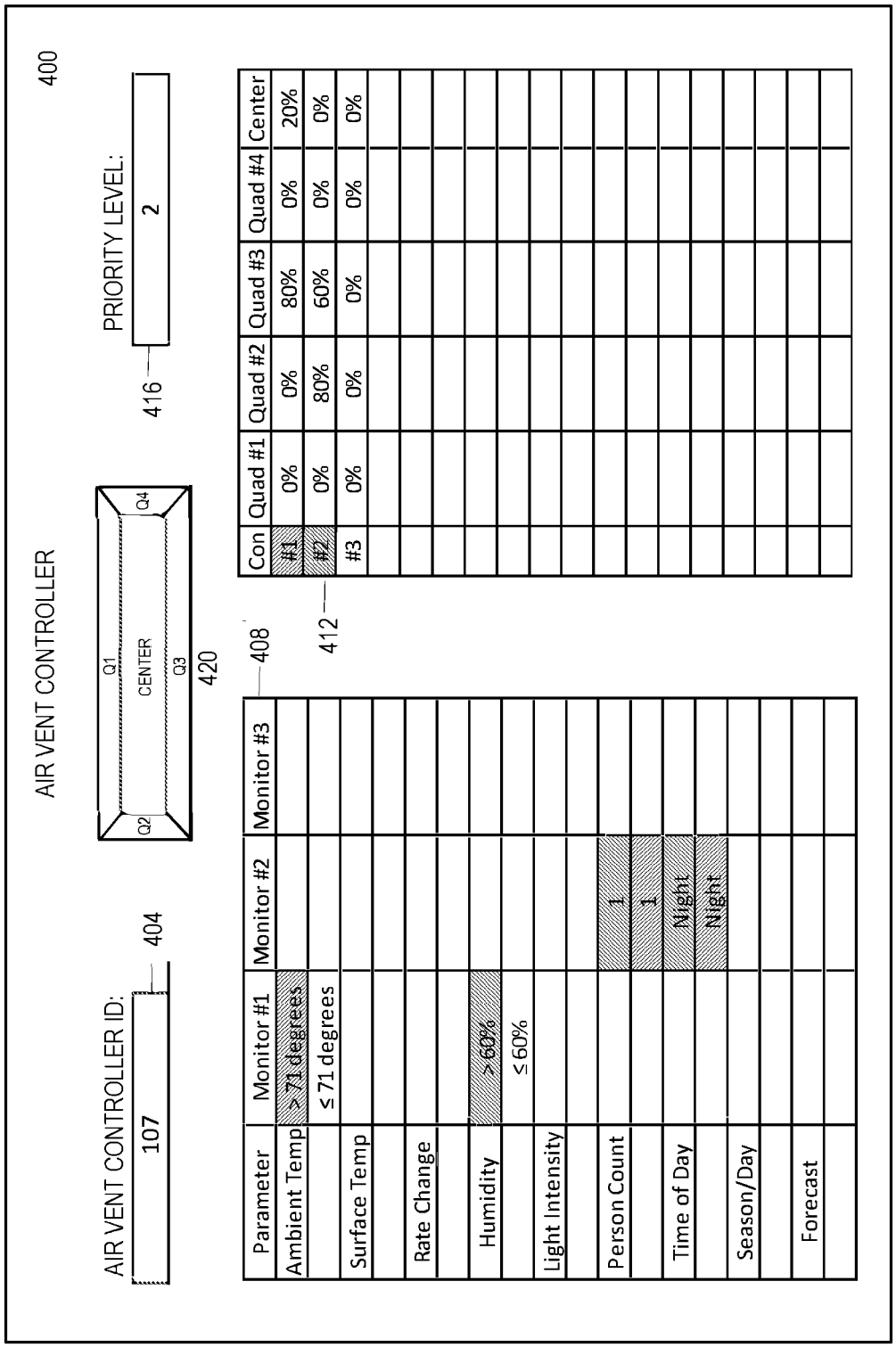
FIG. 4 illustrates an example user interface for configuring rules of the rule base, in accordance with an example embodiment.

FIG. 4 illustrates an example user interface 400 for configuring rules of the rule base 224, in accordance with an example embodiment. The user interface 400 may be generated by, for example, the user interface module 208.

As illustrated in FIG. 4, the user interface 400 comprises an air vent controller identifier field 404 for entering the identity of the air vent system 100 (a plurality of air vent systems 100 may be controlled from the same user interface 400) and a priority level field 416 for entering the priority level for the displayed conditions. A conditions table 408 allows a user to enter the set of conditions for each configuration corresponding to the identified priority level, as described more fully above by way of example in conjunction with FIG. 3A. A configuration table 412 allows a user to enter the configurations corresponding to each set of conditions for the identified priority level, as described more fully above by way of example in conjunction with FIG. 3B. A location field (not shown) allows a user to select the location of the identified air vent system 100. The selectable locations include, for example, ceiling, floor, wall high, wall middle, and wall low (where "high," "middle," and "low" indicate the height position of the air vent system 100 on the wall). A quadrant legend 420 graphically displays the location of each quadrant of the air vent system 100 when viewed from the exit side of the vent.

In one example embodiment, the air vent system 100 is adjusted based on an ambient temperature, a surface temperature of an entity, a rate of a temperature change, a humidity level, an amount of light received, an amount of sunlight received, a time of day, a season, a location or activity of a person, a number (count) of occupants of a room or building, a user request, a weather forecast, and the like.

In one example embodiment, an air controller processing module processes one or more of the monitored parameters to control the air vent system 100. For example, if a monitored temperature increases above or below a specified temperature, the amount of air flow permitted by the air vent system 100 may be increased or decreased, respectively.

In one example embodiment, monitors 132 may be deployed at different locations. The amount of air flow, direction of the air flow, or both may be adjusted based on reports from the monitors 132. For example, a surface temperature sensor of the monitors 132 may detect that a surface temperature of an entity, such as a floor, wall, desk, and the like, exceeds a specified temperature, is increasing or decreasing in temperature, and the like. Air flow can then be directed toward or away from the location of the monitors 132, or a location assigned to the monitors 132 (in cases where the monitor 132 is located at a different location). In one example embodiment, a combination of measured parameters is used to adjust the amount of air flow, the direction of the air flow, or both based on a predefined configuration or a dynamic adjustment as described below.

In one example embodiment, a user may request a particular configuration of the air vent system 100. For example, a user may use a remote control unit, an application on a mobile device, and the like to change the direction of air flow, the amount of air flow, or both. The user can select a predefined configuration of the air vent system 100, can select a user-defined configuration of the air vent system 100, or can dynamically (such as incrementally) adjust the fins 136 of the air vent system 100.

In one example embodiment, motion sensors in a monitor 132 can detect a presence of a person and direct air flow toward or away from the person. For example, the air flow can be directed toward a person at a desk when the ambient temperature is high, away from a person in a bed when the ambient temperature is low, toward a person using a treadmill, and the like. The amount of air flow can be increased when the count of persons is high and decreased when the count of persons is low. Similarly, the surface temperature of various elements in a room, such as a wall, furniture, and the like, can be monitored by a temperature sensor in a monitor 132, and the amount of air flow, direction of air flow, or both can be adjusted based on the monitored surface temperature.

In one example embodiment, the air vent system 100 may be adjusted to anticipate a change in the temperature or humidity level of a room or other location based on the season or weather forecast. For example, the season may be indicative of which locations in a room will receive sunlight and therefore how the air vent system 100 should be configured. Similarly, the weather forecast may be indicative of an amount of received sunlight, an external temperature, and an external humidity level, and may suggest a configuration of the air vent system 100 in anticipation of changes that will affect the environmental conditions of the room. Similarly, the amount of light received can be monitored by a sensor in a monitor 132, and the amount of air flow, direction of air flow, or both can be adjusted based on the measurement of the received amount of light.

In one example embodiment, a set of conditions reported by a monitor 132, or a plurality of monitors 132, is used to determine a configuration of the air vent system 100. Multiple sets of conditions may also be defined along with corresponding configurations. The configuration(s) that corresponds to each set of conditions may be the same, or may be different. In some cases, a plurality of sets of conditions may not be mutually exclusive; that is, one or more sets of a plurality of sets of conditions may be satisfied at the same time.

If two or more sets of conditions are satisfied at the same time and the configurations do not conflict (that is, it is possible to establish the configurations simultaneously), then each configuration is executed when its corresponding set of conditions is satisfied. If the configurations conflict (that is, it is not possible to establish the configurations simultaneously because, for example, the configurations specify conflicting configurations of the fins 136), then a priority level assigned to each set of conditions may be used to determine which configuration(s) is executed. It is to be noted that different sets of conditions may be assigned the same priority level if their corresponding configurations do not conflict with each other, if it is not possible for the sets of conditions to be satisfied simultaneously, or both.

In one example embodiment, the air vent system 100 operates as a single control zone where a subset of fins 136 is controlled as a single unit. In one example embodiment, the air vent system 100 has a plurality of control zones; each control zone controls a defined subset of fins 136, controls an amount of air flow for the defined subset of fins 136, or both. For example, zone 1 may control fins 136 #1-8 and zone 2 may control fins 136 #12-20. (Fins 136 #9-11 may be fins 136 whose orientation, location, or both cannot be adjusted by the air vent system 100.)

In one example embodiment, a subset of fins 136 is configured to control an amount of air flow and a direction of air flow. In one example embodiment, a subset of fins 136 is configured to control a direction of air flow, and the amount of air flow is either static or is controlled by a separate damper mechanism. In one example embodiment, a subset of fins 136 is configured to control an amount of air flow, and a direction of air flow is either static or is controlled by a separate set of fins 136.

The amount of air flow may be fixed, or may be controlled by the configuration of the fins 136. In one example embodiment, an amount of air flow for each subset of fins 136 may be individually controlled, either by the subset of fins 136 themselves or by a separate damper mechanism. For example, a separate damper mechanism may be located in the air duct 124 between the source of the air flow and the fins 136.

In one example embodiment, a plurality of users in, for example, a room can submit requests to control air flow to particular locations in the room. The requests may be issued, for example, from a plurality of applications executing on a plurality of mobile devices. Thus, for example, diners at a restaurant may each submit requests to alter the air flow impacting their location. If the requests do not conflict, all the requests may be executed. If the requests conflict, then a compromise configuration can be executed. For example, if a section of a room is at 72 degrees and one user requests 68 degrees and another user requests 64 degrees, the air vent system 100 may be configured for 66 degrees. The section of the room can be identified in the request by, for example, an identifier assigned to the table where the patrons are located and that is mapped to a corresponding location in the room.

In one example embodiment, a user interface control page may be defined comprising one or more conditions and corresponding configurations for the air vent system 100. If the conditions are satisfied, the identified configuration(s) is executed. For example, a first configuration and a second configuration may be executed if the temperature at a first monitoring unit is greater than 70 degrees and the humidity level at a second monitoring unit is above 60%.

Multiple sets of conditions along with corresponding configurations may be defined on a single control page. In one example embodiment, all sets of conditions defined on the same control page have the same priority level. In one example embodiment, sets of conditions on the same control page may have different priority levels. For ease of use, a user interface may be defined where the conditions and configuration(s) for one set of conditions are displayed in the same color, with the same background, and the like.

In one example embodiment, one or more configurations may be associated with a first set of conditions and one or more configurations may be associated with a second set of conditions at the same priority level if 1) the configurations of the first set of conditions do not conflict with the configurations of the second set of conditions; or 2) it is not possible for the first set of conditions and second set of conditions to be simultaneously satisfied. If both 1) and 2) are not true, a first control page may be established for the one or more configurations associated with the first set of conditions, and a second control page may be established for the one or more configurations associated with the second set of conditions; each control page (or, correspondingly, each set of conditions) can be assigned a different priority level such that the configuration(s) of the lower-priority control page can only be executed if the condition(s) of the higher-priority control page are not satisfied.

Figure 5:
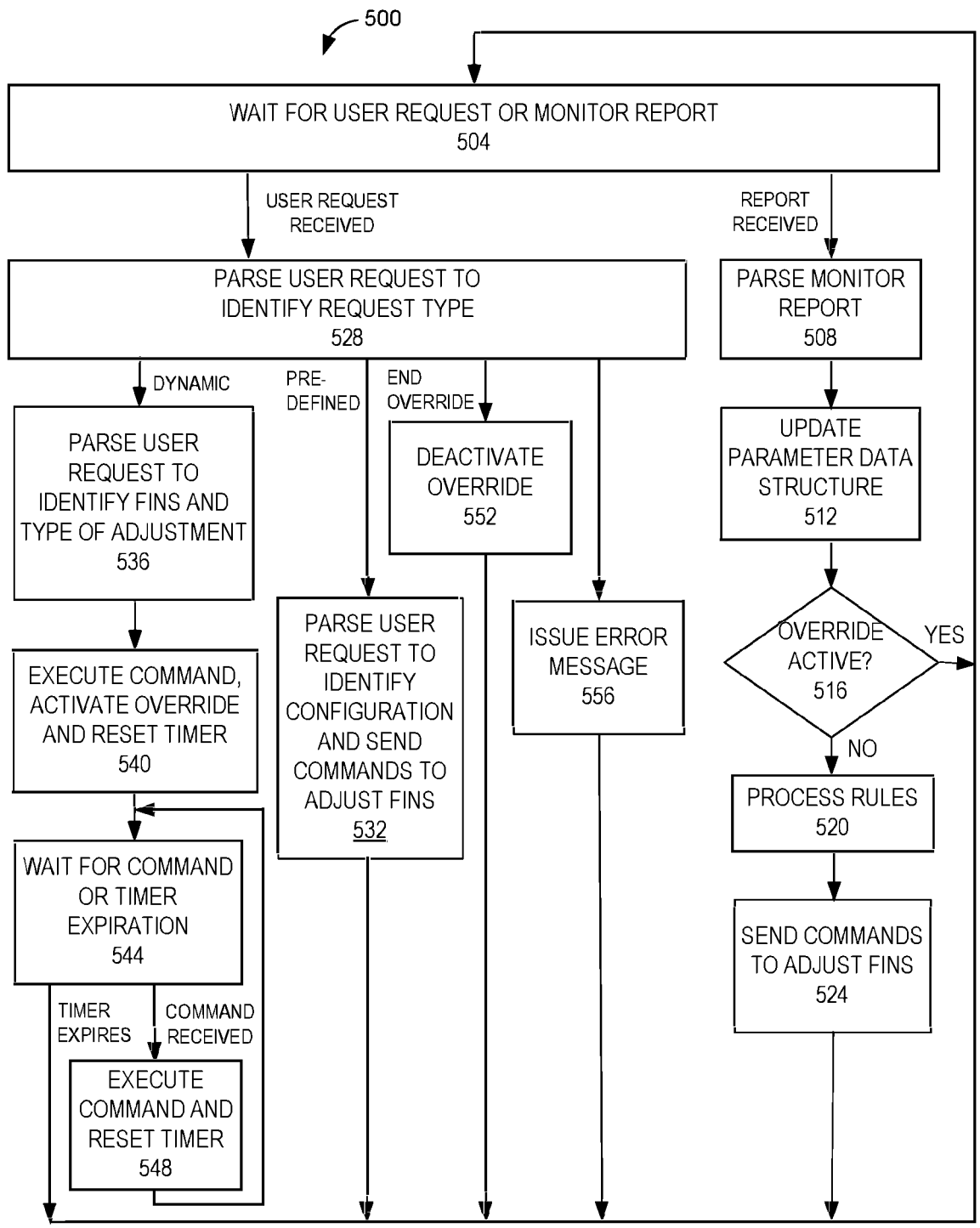
FIG. 5 is a flowchart for an example method for controlling air flow, in accordance with an example embodiment.

FIG. 5 is a flowchart for an example method 500 for controlling air flow, in accordance with an example embodiment. In one example embodiment, one or more of the operations of the method 500 may be performed by the air control processing system 116.

In one example embodiment, a test is performed to determine if a report from a monitor 132 or a user request has been received (operation 504). If no report or request has been received, operation 504 is repeated; if a user request is received, the method 500 proceeds with operation 528; otherwise, the report is parsed to determine the identity of the parameter(s) included in the report (operation 508).

A parameter data structure is updated with the values of the identified parameters in the received report (operation 512). A test is performed to determine if the air vent system 100 is in user override mode (i.e., the automatic configuration of the air vent system 100 has been overridden by a user request; operation 516). If the air vent system 100 is in user override mode, the method 500 proceeds with operation 504; otherwise, the revised parameter data structure is processed using the rule(s) of the rule base 224 to determine changes, if any, to be made to the configuration of the air vent system 100 (operation 520). Commands are sent to the air deflector actuator unit 112 to adjust one or more of the fins 136 and dampers (not shown), if indicated by the processing of the revised parameter data structure using the rule(s) of the rule base 224 (operation 524). The method 500 then proceeds with operation 504.

During operation 528, the user request is parsed to determine the type of request. If the request is to execute a predefined configuration, the method 500 proceeds with operation 532; if the request is to execute a dynamic configuration, the method 500 proceeds with operation 536; if the request is to end user override of the system and return to automatic control, the method 500 proceeds with operation 552; otherwise, the method 500 proceeds with operation 556.

During operation 532, the request is parsed to determine an identity of the predefined configuration requested by the user and commands are sent to the air deflector actuator unit 112 to adjust one or more of the fins 136 and dampers (not shown) according to the predefined configuration. The method 500 then proceeds with operation 504.

During operation 536, the request is parsed to determine an identity of the fins 136 to be adjusted and the type of adjustment (location, orientation (such as rotate clockwise or counter-clockwise), or both). The fins 136 are adjusted (for example, a command to rotate the fins 136 by five degrees may be sent to the air deflector actuator unit 112), an adjustment timer is reset, and an override variable is activated (operation 540), and the method 500 waits for reception of another dynamic adjustment command or an expiration of the timer (operation 544). If the timer expires (e.g., the user is done adjusting the air vent system 100), the method 500 proceeds with operation 504; if a dynamic adjustment command is received from a user device 104, the method 500 proceeds with operation 548.

During operation 548, the timer is reset and commands are sent to the air deflector actuator unit 112 to incrementally adjust the fin(s) 136 identified by the command during operation 536. For example, a command to rotate the fins 136 by five degrees may be sent to the air deflector actuator unit 112. The method 500 proceeds to operation 544.

During operation 552, the override variable is deactivated and the method 500 proceeds to operation 504. During operation 556, an error message is issued to the user device 104 to notify the user that an unrecognized command was received. The method 500 proceeds to operation 504.

Although certain examples are shown and described here, other variations exist and are within the scope of the invention. It will be appreciated, by those of ordinary skill in the art, that any arrangement that is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 6:
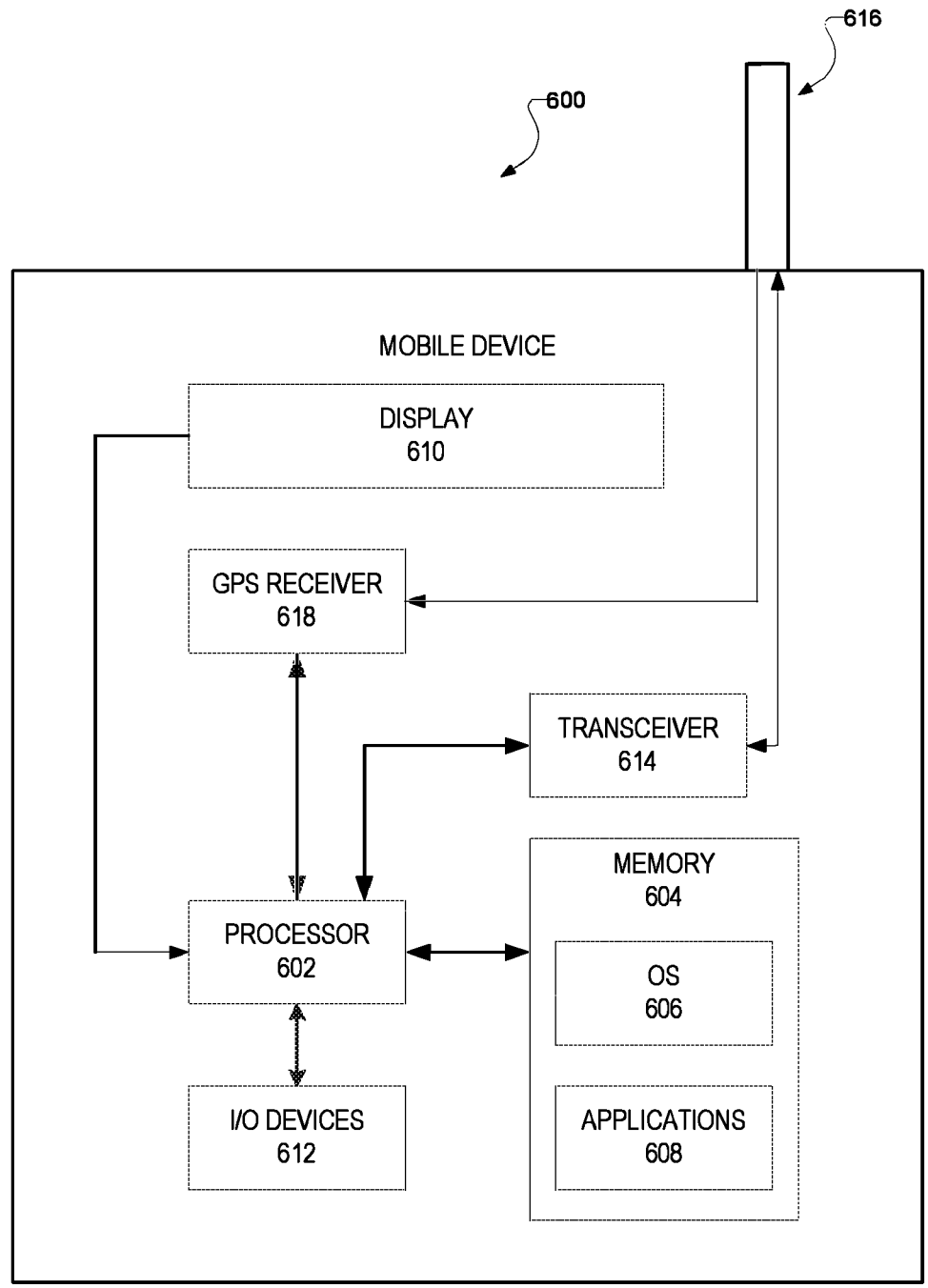
FIG. 6 is a block diagram illustrating an example mobile device, according to an example embodiment.

FIG. 6 is a block diagram illustrating an example mobile device 600, according to an example embodiment. The mobile device 600 may include a processor 602. The processor 602 may be any of a variety of different types of commercially available processors suitable for mobile devices (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 may be adapted to store an operating system (OS) 606, as well as application programs 608, such as a mobile location enabled application that may provide location-based services (LBSs) to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a Global Positioning System (GPS) receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between or among such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
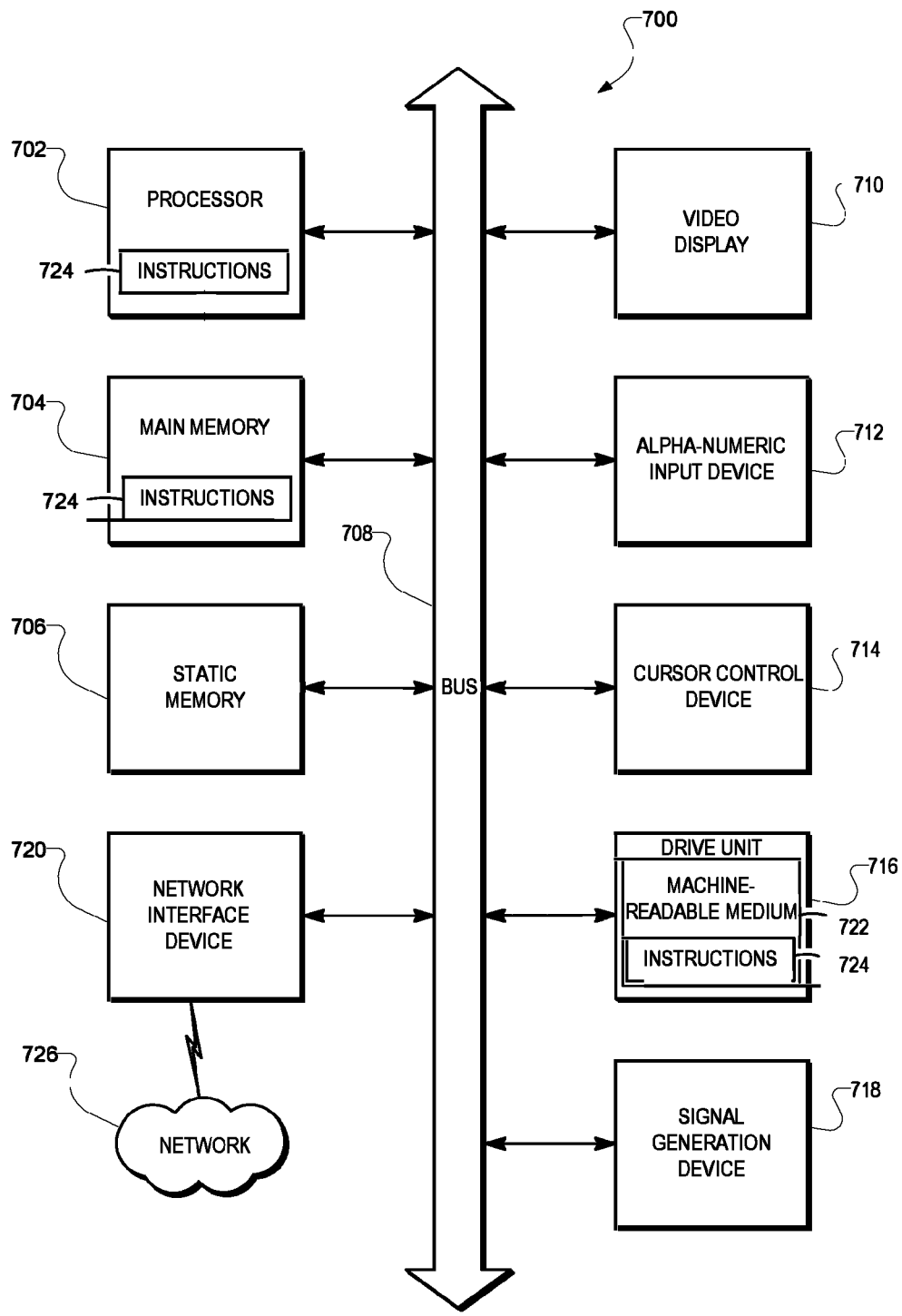
FIG. 7 is a block diagram of a machine within which instructions may be executed for causing the machine to perform any one or more of the methodologies discussed herein.

FIG. 7 is a block diagram of a machine in the example form of a computer system 700 within which instructions may be executed for causing the machine to perform any one or more of the methodologies discussed herein. In one example embodiment, the machine may be the example apparatus 200 of FIG. 2 for controlling an air deflector and an air deflector actuator unit. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a drive unit 716, a signal generation device 718 (e.g., a speaker), and a network interface device 720.

Machine-Readable Medium

The drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media 722. The instructions 724 may also reside within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding, or carrying the instructions 724 for execution by the machine and that cause the machine to perform any one or more of the methodologies of the present invention, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., hypertext transfer protocol (HTTP)). Examples of communications networks 726 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 724 for execution by the machine, and includes digital or analog communications signals or other intangible media to facilitate communication of such instructions 724.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for controlling air flow, the system comprising:
   a remote monitor for obtaining an environmental parameter;
   an air deflector configured for controlling a direction of air flow exiting an air duct;

an air deflector actuator for configuring the air deflector, the configuration of the air deflector being based on an evaluation of the environmental parameter from the remote monitor and an evaluation of a relative location in three-dimensional space of the remote monitor in relation to the air deflector, the remote monitor being remote from the air deflector.

2. The system of claim 1, wherein the environmental parameter characterizes a weather forecast and is indicative of an external temperature, a solar exposure, or a humidity level.

3. The system of claim 1, wherein the air deflector is configured in anticipation of a change in temperature or humidity level based on a season or a weather forecast.

4. The system of claim 1, wherein the air deflector comprises one or more fins and wherein each fin may have a fixed location, a configurable location, a fixed orientation, a configurable orientation, or a combination thereof.

5. The system of claim 1, wherein the air deflector actuator is configured to configure the air deflector in response to a request from a user to configure the air deflector based on a predefined configuration or based on a dynamic adjustment of the air deflector.

6. The system of claim 1, wherein the air deflector actuator is configured to configure the air deflector in response to a set of two or more environmental conditions being satisfied.

7. The system of claim 1, wherein a priority level is assigned to each of a plurality of sets of two or more environmental conditions, the priority level being used to identify one of the plurality of sets when at least two of the sets of environmental conditions are satisfied concurrently.

8. The system of claim 1, wherein the air deflector has a plurality of control zones, wherein each control zone controls a defined subset of fins of the air deflector, and wherein the air deflector actuator is configured to configure two or more of the defined subsets of fins of the air deflector.

9. The system of claim 1, wherein the air deflector actuator is configured to configure the air deflector in response to a request from one or more users to configure the air deflector based on a requested temperature.

10. A method for controlling air flow, the method comprising:
obtaining an environmental parameter from a remote monitor; and
configuring an air deflector, the configuring of the air deflector being based on an evaluation of the environmental parameter from the remote monitor and an evaluation of a relative location in three-dimensional space of the remote monitor in relation to the air deflector, and the configuring of the air deflector controlling a direction of air flow exiting an air duct, the remote monitor being remote from the air deflector.

11. The method of claim 10, wherein the environmental parameter characterizes a weather forecast and is indicative of an external temperature, a solar exposure, or a humidity level.

12. The method of claim 10, wherein the configuring of the air deflector is based on an anticipation of a change in temperature or humidity level based on a season or a weather forecast.

13. The method of claim 10, wherein the air deflector comprises one or more fins and wherein each fin may have a fixed location, a configurable location, a fixed orientation, a configurable orientation, or a combination thereof.

14. The method of claim 10, further comprising configuring the air deflector in response to a request from a user to configure the air deflector based on a predefined configuration or based on a dynamic adjustment of the air deflector.

15. The method of claim 10, further comprising configuring the air deflector in response to a set of two or more environmental conditions being satisfied.

16. The method of claim 10, further comprising assigning a priority level to each of a plurality of sets of two or more environmental conditions, the priority level identifying one of the plurality of sets when at least two of the sets of environmental conditions are satisfied concurrently.

17. The method of claim 10, wherein the air deflector has a plurality of control zones, wherein each control zone controls a defined subset of fins of the air deflector, and further comprising configuring two or more of the defined subsets of fins of the air deflector corresponding to a proper subset of the control zones.

18. The method of claim 10, further comprising configuring the air deflector in response to a request from one or more users to configure the air deflector based on a requested temperature.

19. A non-transitory machine-readable storage medium comprising instructions, which when implemented by one or more machines, cause the one or more machines to perform operations comprising:
obtaining an environmental parameter from a remote monitor; and
configuring an air deflector, the configuring of the air deflector being based on an evaluation of the environmental parameter from the remote monitor and an evaluation of a relative location in three-dimensional space of the remote monitor in relation to the air deflector, and the configuring of the air deflector controlling a direction of air flow exiting an air duct, the remote monitor being remote from the air deflector.

* * * * *